US012603597B2

(12) United States Patent
Hedges et al.

(10) Patent No.: US 12,603,597 B2
(45) Date of Patent: Apr. 14, 2026

(54) SYSTEMS AND METHODS FOR CONTROLLING OPERATION OF INVERTER FOR ELECTRIC VEHICLE

(71) Applicant: BorgWarner US Technologies LLC, Wilmington, DE (US)

(72) Inventors: Mary T. Hedges, Greentown, IN (US); Deepa Susan Rajan, Bangalore (IN)

(73) Assignee: BorgWarner US Technologies LLC, Wilmington, DE (US)

( * ) Notice: Subject to any disclaimer, the term of this patent is extended or adjusted under 35 U.S.C. 154(b) by 330 days.

(21) Appl. No.: 18/536,497

(22) Filed: Dec. 12, 2023

(65) Prior Publication Data

US 2025/0192710 A1     Jun. 12, 2025

(51) Int. Cl.
| | |
|---|---|
| *B60L 15/08* | (2006.01) |
| *H02M 1/38* | (2007.01) |
| *H02M 7/5387* | (2007.01) |
| *H02M 7/5395* | (2006.01) |
| *H02P 27/08* | (2006.01) |

(52) U.S. Cl.
CPC .............. *H02P 27/08* (2013.01); *B60L 15/08* (2013.01); *H02M 1/38* (2013.01); *H02M 1/385* (2021.05); *H02M 7/5387* (2013.01); *H02M 7/5395* (2013.01)

(58) Field of Classification Search
CPC ...... H02M 1/38; H02M 1/385; H02M 7/5387; H02M 7/5395; H02P 27/08; B60L 15/08
See application file for complete search history.

(56) References Cited

U.S. PATENT DOCUMENTS

| | | | |
|---|---|---|---|
| 11,239,787 B2 | 2/2022 | Secrest | |
| 2002/0093391 A1* | 7/2002 | Ishida | ............... H02M 7/53871 |
| | | | 332/109 |
| 2020/0119681 A1* | 4/2020 | Lee | ........................... B60K 6/48 |
| 2024/0348149 A1* | 10/2024 | Mayer | ..................... H02M 1/32 |

* cited by examiner

*Primary Examiner* — Fred E Finch, III
(74) *Attorney, Agent, or Firm* — Joshua M. Haines; Bookoff McAndrews, PLLC

(57) ABSTRACT

A system includes: an inverter including a first switch and a second switch; one or more controllers configured to control the inverter by performing operations, the operations including: generating a minimum pulse width value for a first pulse-width modulated (PWM) signal to control the first switch and for a second PWM signal to control the second switch; determining that an on-time pulse to be generated for the first PWM signal will be less than or equal to the minimum pulse width value for a period based on a first deadtime configuration; and in response to the determining: determining a second deadtime configuration for the first PWM signal and the second PWM signal for the period; and generating the first PWM signal and the second PWM signal based on the second deadtime configuration, to prevent the on-time pulse that is less than or equal to the minimum pulse width value.

14 Claims, 11 Drawing Sheets

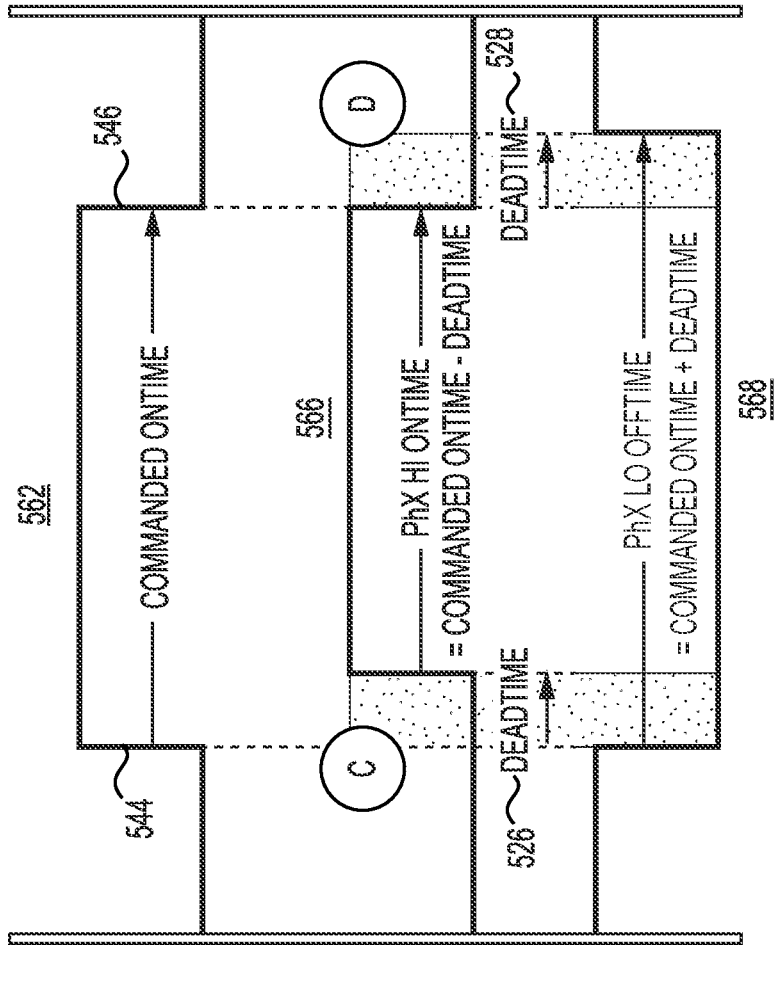
*FIG. 5*

1000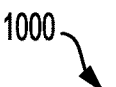

LOGIC EXECUTED NEAR END OF PERIOD,
BUT BEFORE PERIOD BOUNDARY

1002 — MOTOR CONTROL LOGIC
DETERMINES COMMANDED
ONTIME FOR PHASE X

1004 — PWM DRIVER CALCULATES
WHAT THE ONTIMES WILL
BE FOR BOTH PHASE X HI AND LO.

1006 — IF
ONTIME ≤ MINIMUM
PERMITTED ON EITHER
HI OR LO PHASE?          — NO

YES

1008 — CONFIGURE HW EXTEND DEADTIME
BY MINIMUM PULSE WIDTH NOW TO
PREVENT SMALL PULSE AT PERIOD
BOUNDARY
*OR*
SET FLAG TO EXTEND DEADTIMES
AFTER PERIOD BOUNDARY
TO PREVENT SMALL PULSE
IN CENTER PERIOD

DEADTIMES CONFIGURED WITH
DEFAULT VALUES.          — 1010

END

*FIG. 10*

1100
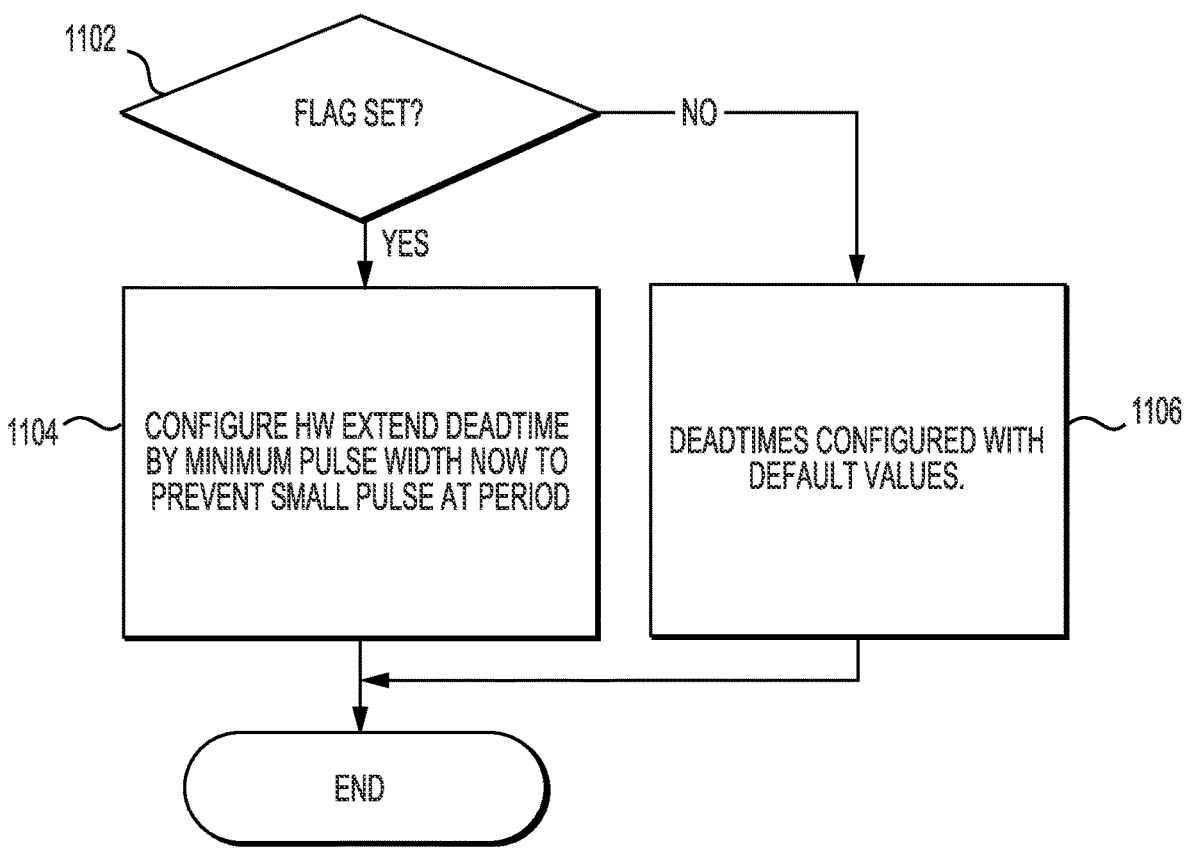
LOGIC EXECUTED JUST AFTER PERIOD BOUNDARY
1102
FLAG SET?
NO
YES
1104
CONFIGURE HW EXTEND DEADTIME BY MINIMUM PULSE WIDTH NOW TO PREVENT SMALL PULSE AT PERIOD
1106
DEADTIMES CONFIGURED WITH DEFAULT VALUES.
END
FIG. 11

SYSTEMS AND METHODS FOR CONTROLLING OPERATION OF INVERTER FOR ELECTRIC VEHICLE

TECHNICAL FIELD

Various embodiments of the present disclosure relate generally to systems and methods for controlling an operation of an inverter for an electric vehicle and, more particularly, to controlling operation of an inverter for an electric vehicle by controlling a pulse-width modulation (PWM) signal.

BACKGROUND

Inverters include power semiconductor devices that have nonzero turn-on and turn-off times. These power semiconductor devices may be prone to degradation for various reasons, such as switching losses, voltage and/or current ripples, elevated temperatures, or stress caused by high switching frequencies.

The present disclosure is directed to overcoming one or more of these above-referenced challenges.

SUMMARY OF THE DISCLOSURE

In some aspects, the techniques described herein relate to a system including: an inverter including a first switch and a second switch; one or more controllers configured to control the inverter by performing operations, the operations including: generating a minimum pulse width value for a first pulse-width modulated (PWM) signal to control the first switch and for a second PWM signal to control the second switch, the first PWM signal and the second PWM signal associated with a commanded PWM signal; determining that an on-time pulse to be generated for the first PWM signal will be less than or equal to the minimum pulse width value for a first period based on a first deadtime configuration; and in response to the determining: determining a second deadtime configuration for the first PWM signal and the second PWM signal for the first period, the second deadtime configuration being different from the first deadtime configuration; and generating the first PWM signal and the second PWM signal based on the second deadtime configuration, so that the generated first PWM signal maintains a low state for the first period and prevents the on-time pulse that is less than or equal to the minimum pulse width value.

In some aspects, the techniques described herein relate to a system, wherein each of the first deadtime configuration and the second deadtime configuration includes one or more of: a first deadtime value associated with a rising edge of the commanded PWM signal or a second deadtime value associated with a falling edge of the commanded PWM signal.

In some aspects, the techniques described herein relate to a system, wherein the first deadtime value for the first deadtime configuration and the first deadtime value for the second deadtime configuration are different, and the second deadtime value for the first deadtime configuration and the second deadtime value for the second deadtime configuration are the same.

In some aspects, the techniques described herein relate to a system, wherein the first deadtime value for the first deadtime configuration and the first deadtime value for the second deadtime configuration are the same, and the second deadtime value for the first deadtime configuration and the second deadtime value for the second deadtime configuration are different.

In some aspects, the techniques described herein relate to a system, wherein the first deadtime value or the second deadtime value of the first deadtime configuration is increased by the minimum pulse width value to determine the second deadtime configuration.

In some aspects, the techniques described herein relate to a system, the operations further including: before a start of a second period for the first PWM signal and the second PWM signal: restoring the first deadtime configuration; and applying the first deadtime configuration instead of the second deadtime configuration to the first PWM signal and the second PWM signal.

In some aspects, the techniques described herein relate to a system, the operations further including: after a start of a second period for the first PWM signal and the second PWM signal: restoring the first deadtime configuration; and applying the first deadtime configuration instead of the second deadtime configuration to the first PWM signal and the second PWM signal.

In some aspects, the techniques described herein relate to a system, further including: a gate drive integrated circuit configured to receive the first PWM signal and the second PWM signal and drive one or more operations of the inverter.

In some aspects, the techniques described herein relate to a system, further including: a motor configured to rotate based on one or more operations of the inverter, wherein the system is provided as a vehicle including the motor.

In some aspects, the techniques described herein relate to a method for controlling a system, the system including an inverter including a first switch and a second switch, the method including: performing, by one or more controllers, operations for controlling the inverter, the operations including: generating a minimum pulse width value for a first pulse-width modulated (PWM) signal to control the first switch and for a second PWM signal to control the second switch, the first PWM signal and the second PWM signal associated with a commanded PWM signal; determining that an on-time pulse to be generated for the first PWM signal will be less than or equal to the minimum pulse width value for a first period based on a first deadtime configuration; and in response to the determining: determining a second deadtime configuration for the first PWM signal and the second PWM signal for the first period, the second deadtime configuration different from the first deadtime configuration; and generating the first PWM signal and the second PWM signal based on the second deadtime configuration, so that the generated first PWM signal maintains a low state for the first period and prevents the on-time pulse that is less than or equal to the minimum pulse width value.

In some aspects, the techniques described herein relate to a method, wherein each of the first deadtime configuration and the second deadtime configuration includes one or more of: a first deadtime value associated with a rising edge of the commanded PWM signal or a second deadtime value associated with a falling edge of the commanded PWM signal.

In some aspects, the techniques described herein relate to a method, wherein the minimum pulse width value ranges from approximately 0% of the first period to approximately 3% of the first period, and each of the first deadtime value and the second deadtime value of the first deadtime configuration is larger than the minimum pulse width value and ranges from approximately 0% of the first period to approximately 4% of the first period.

In some aspects, the techniques described herein relate to a method, wherein the first deadtime value or the second deadtime value of the first deadtime configuration is increased by the minimum pulse width value to determine the second deadtime configuration.

In some aspects, the techniques described herein relate to a method, the operations further including: before a start of a second period for the first PWM signal and the second PWM signal: restoring the first deadtime configuration; and applying the first deadtime configuration instead of the second deadtime configuration to the first PWM signal and the second PWM signal.

In some aspects, the techniques described herein relate to a method, the operations further including: after a start of a second period for the first PWM signal and the second PWM signal: restoring the first deadtime configuration; and applying the first deadtime configuration instead of the second deadtime configuration to the first PWM signal and the second PWM signal.

In some aspects, the techniques described herein relate to a system including: one or more controllers configured to perform operations including: generating a minimum pulse width value for a first pulse-width modulated (PWM) signal and for a second PWM signal, the first PWM signal and the second PWM signal associated with a commanded PWM signal for controlling a first switch and a second switch of an inverter; determining that an on-time pulse to be generated for the first PWM signal will be less than the minimum pulse width value for a first period based on a first deadtime configuration; and in response to the determining: determining a second deadtime configuration for the first PWM signal and the second PWM signal for the first period, the second deadtime configuration different from the first deadtime configuration; and generating the first PWM signal and the second PWM signal based on the second deadtime configuration, so that the generated first PWM signal maintains a low state for the first period and prevents the on-time pulse that is less than or equal to the minimum pulse width value.

In some aspects, the techniques described herein relate to a system, wherein each of the first deadtime configuration and the second deadtime configuration includes one or more of: a first deadtime value associated with a rising edge of the commanded PWM signal or a second deadtime value associated with a falling edge of the commanded PWM signal.

In some aspects, the techniques described herein relate to a system, wherein the determining the second deadtime configuration includes increasing the first deadtime value or the second deadtime value of the first deadtime configuration by the minimum pulse width value.

In some aspects, the techniques described herein relate to a system, wherein the first deadtime value of the first deadtime configuration and the second deadtime configuration is stored in a first register of the one or more controllers, and the second deadtime value of the first deadtime configuration and the second deadtime configuration is stored in a second register of the one or more controllers.

In some aspects, the techniques described herein relate to a system, the operations further including: before a start of a second period for the first PWM signal and the second PWM signal: restoring the first deadtime configuration; and applying the first deadtime configuration instead of the second deadtime configuration to the first PWM signal and the second PWM signal.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts a plot of various pulse-width modulation (PWM) signals for controlling an inverter, according to one or more embodiments.

FIG. 10 depicts an exemplary method for preventing a small pulse from being generated, according to one or more embodiments.

FIG. 11 depicts an exemplary method for preventing a small pulse from being generated at a center of a period, according to one or more embodiments.

DETAILED DESCRIPTION OF EMBODIMENTS

Figure 1:
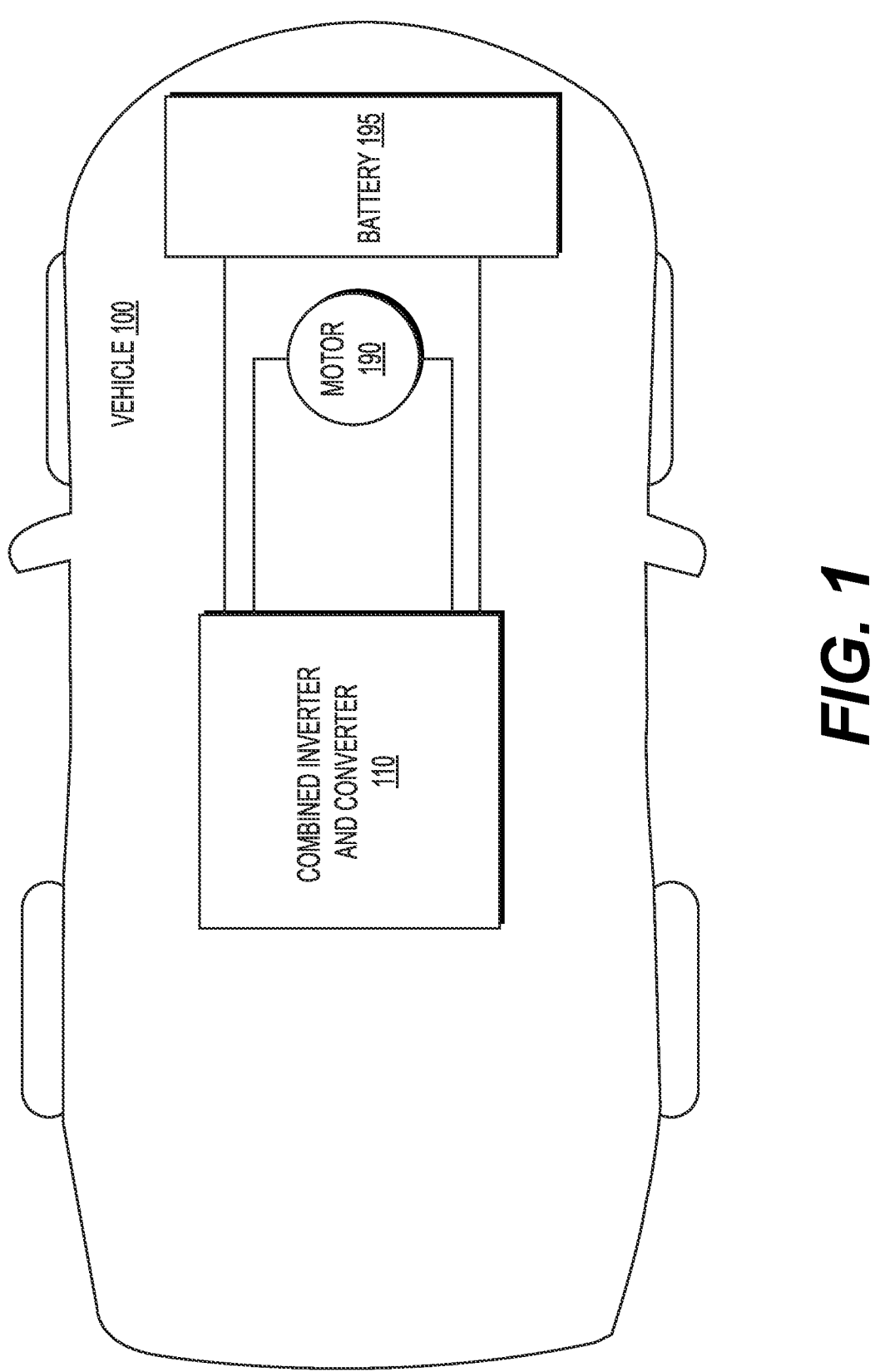
FIG. 1 depicts an exemplary system infrastructure for a vehicle including a combined inverter and converter, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices may be described as switches or devices, but may refer to any device for controlling the flow of power in an electrical circuit. For example, switches may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Various embodiments of the present disclosure relate generally to systems and methods for controlling an operation of an inverter for an electric vehicle and, more particularly, to controlling operation of an inverter for an electric vehicle by controlling a pulse-width modulation (PWM) signal.

Power semiconductor devices (e.g., switches or switching devices as described above) may have nonzero turn-on and turn-off times. For example, if a pulse (e.g., pulse-width modulation signal) is commanded which does not allow a power semiconductor device in an inverter to completely turn on or turn off, the power semiconductor device may degrade over time and may eventually fail. As described herein, "deadtime" may refer to an interval where a first switch of a high-side and a second switch of a low-side for a particular phase of an inverter are simultaneously turned off. Various microcontrollers used in inverter applications may contain hardware to enforce deadtime between a high-side and a low-side of an inverter, which may prevent a short circuit of a direct current (DC) link.

As described herein, a minimum pulse width may be defined as the minimum amount of time in which the first switch or the second switch may be turned on, and then off, or vice versa. A pulse that violates or is equal to the minimum pulse width for the first switch or the second switch may be referred to herein as a "small pulse." A small pulse that is generated and delivered to the first switch or the second switch may damage the first switch or the second switch and cause the first switch or the second switch to degrade over time. Some solutions are available for preventing the generation of small pulses for inverters used for electric vehicles. However, these solutions may limit the use of a full duty cycle range of PWM signals, prevent feedback to higher level software indicating an actual pulse width that was generated, and/or prevent the use of existing deadtime hardware in an applicable microcontroller.

For the case where feedback is prevented to higher level software, motor control logic may require that a small pulse be removed or that increasing a pulse width may be preferred in some instances. However, neither method may provide feedback to the higher level software indicating the actual pulse width that was generated. This feedback of the actual commanded pulse width may be useful for some motor control algorithms along with the qualifications of the PWM signals (e.g. for functional safety). For the case where use of existing deadtime hardware is prevented, software may calculate the commanded on-time of both a high-side output signal and a low-side output signal of a particular phase, and adjust the on-times if a small pulse is commanded. However, the software algorithm to prevent or stretch (i.e. increase a width of) the small pulse across all PWM combinations may be very complex. Another disadvantage of this solution may be that controlling two PWM outputs individually may preclude the use of the existing deadtime hardware in the microcontroller. However, this option may provide the expected on-times to the upper level control algorithms if needed.

Additionally, in some hardware implementations, a small pulse (e.g., less than approximately 0.5 microsecond) may first be filtered, and then any remaining small pulses may be stretched so that the pulse width is e.g., approximately 0.5 microsecond<pulse width<approximately 1 microsecond.

Therefore, one or more embodiments may prevent the generation of small pulses and prevent small pulses from being delivered to a first switch of a high-side or a second switch of a low-side for a particular phase of an inverter. One or more embodiments may enable command of a full duty cycle range of PWM signals by blanking (e.g., removing) a small pulse for one of a high-side output or a low-side output, while allowing a pulse of the opposite low-side output or high-side output to continue to decrease. This may enable a commanded PWM signal to reach a full 0% to 100% range, while a pulse of the high-side output or the low-side output is held constant (no pulse) and the pulse of the opposite low-side output or high-side output can continue to shrink until a deadtime is achieved for the high-side output and the low-side output for the first switch and the second switch. One or more embodiments may provide one or more actual pulse widths to a PWM controller as feedback.

One or more embodiments may blank out a pulse using existing deadtime hardware. One or more embodiments may use software to stretch a pulse by changing a commanded PWM signal. One or more embodiments may support either removing or stretching a pulse as requested by the motor control logic. In contrast to a hardware specific solution that may not be able to provide an actual pulse width back to the upper layers of software, one or more embodiments may enable feedback of the actual pulse width back to the upper levels of software.

Accordingly, the complexity of some software or hardware solutions which may control the on-times of phase outputs individually and manually change the on-times when a small pulse is commanded may be solved by one or more embodiments which may reconfigure existing deadtime configurations to prevent generation of a small pulse. Thus, one or more embodiments may leverage the protection of existing deadtime hardware in a microcontroller, which may provide that the hardware is protected from software issues.

FIG. 1 depicts an exemplary system infrastructure for a vehicle including a combined inverter and converter, according to one or more embodiments. In the context of this disclosure, the combined inverter and converter may be referred to as an inverter. As shown in FIG. 1, electric vehicle 100 may include an inverter 110, a motor 190, and a battery 195. The inverter 110 may include components to receive electrical power from an external source and output electrical power to charge the battery 195 of electric vehicle 100. The inverter 110 may convert DC power from the battery 195 in electric vehicle 100 to AC power, to drive (e.g. rotate) the motor 190 of the electric vehicle 100, for example, but the embodiments are not limited thereto. The inverter 110 may be bidirectional, and may convert DC power to AC power, or convert AC power to DC power, such as during regenerative braking, for example. The inverter 110 may be a three-phase inverter, a single-phase inverter, or a multi-phase inverter.

Figure 2:
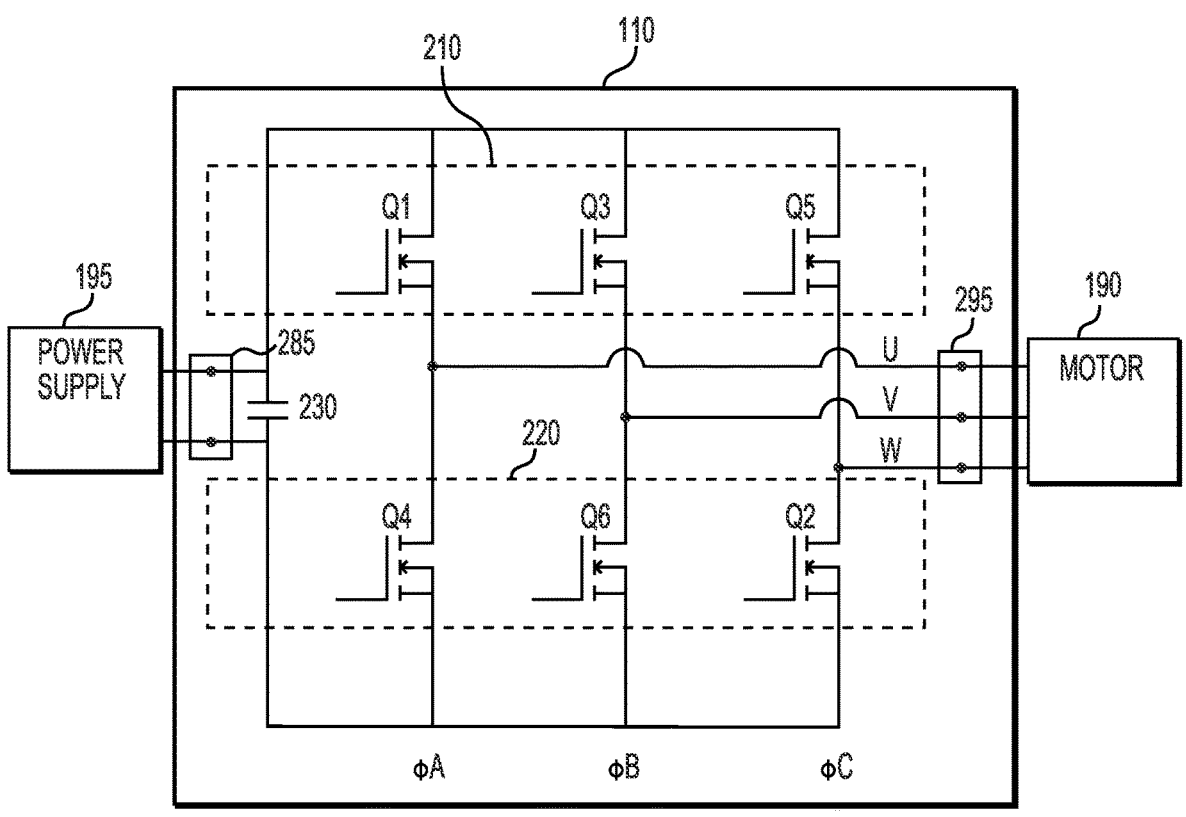
FIG. 2 depicts an electrical power schematic of a three phase inverter module in a connected system, according to one or more embodiments.

FIG. 2 depicts an electrical power schematic of a three phase inverter module, according to one or more embodiments. As shown in FIGS. 1 and 2, the inverter 110 may be connected to the battery, or power supply, 195 and the motor, or load, 190. The inverter 110 may include first three-phase switch group 210, and second three-phase switch group 220. A first phase U may correlate with @A including switches Q1 and Q4, a second phase V may correlate with @B including switches Q3 and Q6, and a third phase W may correlate with @C including switches Q5 and Q2, as illustrated in FIG. 2. The first three-phase switch group 210 may include first phase switch Q1, second phase switch Q3, and third phase switch Q5. The second three-phase switch group 220 may include first phase switch Q4, second phase switch Q6, and third phase switch Q2. The switches Q1-Q6 may be metal-oxide-semiconductor field-effect transistors (MOSFET), for example, but are not limited thereto.

The first three-phase switch group 210 and second three-phase switch group 220 may be driven by a PWM signal (as illustrated, for example, in FIGS. 5-9) generated by inverter controller 300 (shown in FIG. 3) to convert DC power delivered via input terminal set 285 at capacitor 230 to three phase AC power at outputs U, V, and W via output terminal set 295 to the motor 190. Additionally, although FIGS. 1 and 2 illustrate a three-phase inverter, the disclosure is not limited thereto, and may include single phase or multi-phase inverters.

Figure 3:
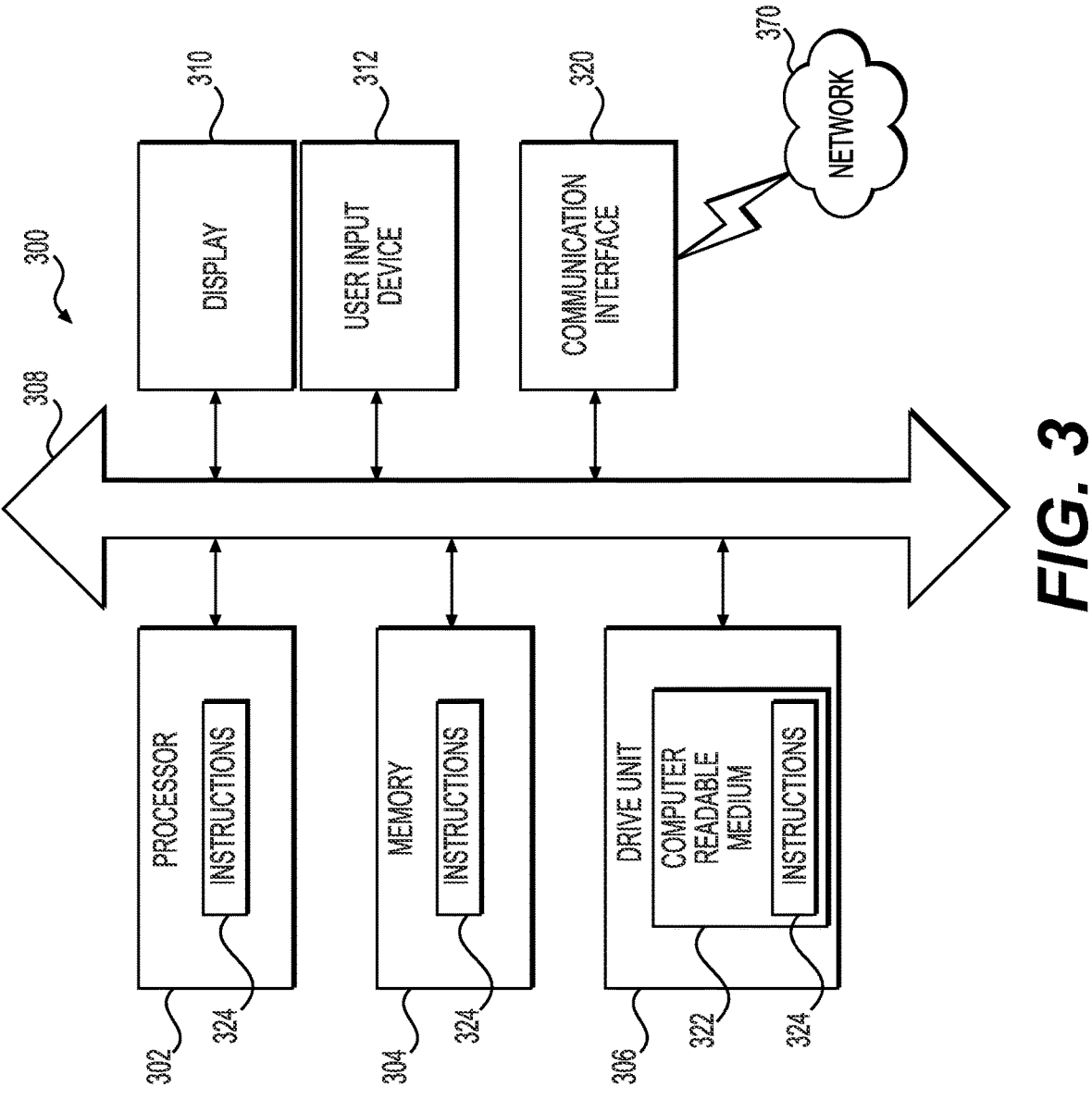
FIG. 3 depicts an implementation of a computer system that may execute techniques presented herein, according to one or more embodiments.

FIG. 3 depicts an exemplary system infrastructure for the inverter controller 300 of FIG. 2, according to one or more embodiments. The inverter controller 300 may include one or more controllers.

The inverter controller 300 may include a set of instructions that can be executed to cause the inverter controller 300 to perform any one or more of the methods or computer based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As shown in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of the inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, the computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or inter-face 320 may be configured to connect with a network 370, external media, the display 310, or any other components in inverter controller 300, or combinations thereof. The con-nection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer sys-tems. One or more implementations described herein may implement functions using two or more specific intercon-nected hardware modules or devices with related control and data signals that can be communicated between and through the modules, or as portions of an application-specific inte-grated circuit. Accordingly, the present system encompasses software, firmware, and hardware implementations.

The inverter controller 300 may be connected to a net-work 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be config-ured to couple one computing device to another computing device to enable communication of data between the devices. The network 370 may generally be enabled to employ any form of machine-readable media for communi-cating information from one device to another. The network 370 may include communication methods by which infor-mation may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the pres-ent disclosure, the methods described herein may be imple-mented by software programs executable by a computer system. Further, in an exemplary, non-limited implementa-tion, implementations can include distributed processing, component or object distributed processing, and parallel processing. Alternatively, virtual computer system process-ing can be constructed to implement one or more of the methods or functionality as described herein.

Although the present specification describes components and functions that may be implemented in particular imple-mentations with reference to particular standards and pro-tocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appro-priate processor (or processors) of a processing (i.e., com-puter) system executing instructions (computer-readable code) stored in storage. It will also be understood that the disclosure is not limited to any particular implementation or programming technique and that the disclosure may be implemented using any appropriate techniques for imple-menting the functionality described herein. The disclosure is not limited to any particular programming language or operating system.

Figure 4:
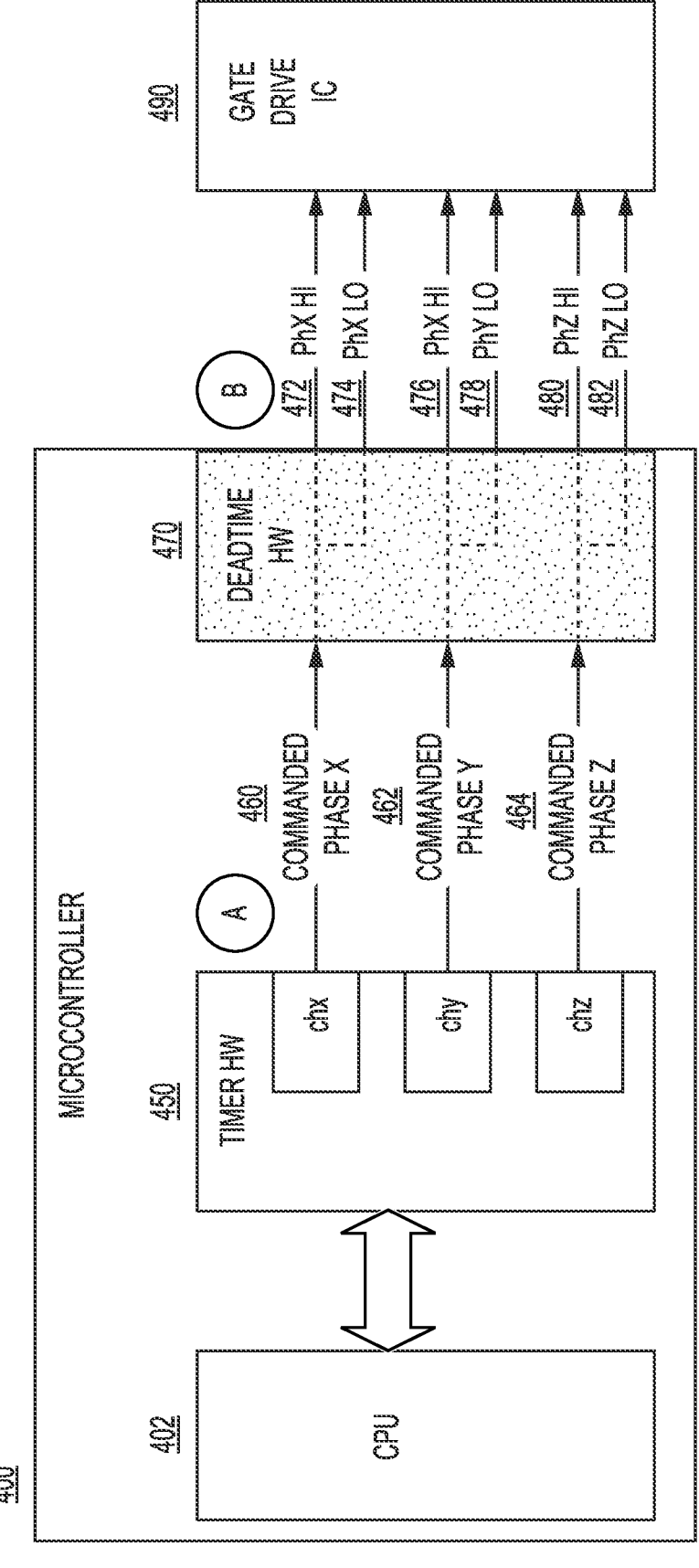
FIG. 4 depicts a block diagram of an inverter controller for use in a system, according to one or more embodiments.

FIG. 4 depicts a block diagram of an inverter controller 400 for use in a system, according to one or more embodi-ments. The inverter controller 400 may be similar to the inverter controller 300 and may be operative to execute similar functions executable by the inverter controller 300. The inverter controller 400 may include the components described with respect to the inverter controller 300. The inverter controller 400 may be a microcontroller. The inverter controller 400 may include a processor 402, timer hardware 450, and deadtime hardware 470. The inverter controller 400 may be configured to control operations of the inverter 110, such as switching operations of the first three-phase switch group 210 and the second three-phase switch group 220. The inverter controller 400 may be configured to control switching operations of particular phases of the inverter 110, such as the first phase U, the second phase V, and the third phase W. In this respect, the inverter controller 400 may be configured to control each phase individually. The inverter controller 400 may be configured to control high-side and low-side switches for a particular phase individually. For example, for the first phase U, the inverter controller 400 may be configured to control the high side switch Q1 and the low side switch Q4 individually. A high-side switch and a low-side switch for a particular phase of the inverter 110 should not be turned on simultaneously, as this may short the battery 195 and cause damage to the components of the inverter 110. As such, the inverter controller 400 may be configured to apply certain deadtime configurations in controlling the switches of the inverter 110, to ensure that a high-side switch and a low-side switch are not turned on simultaneously.

Processor 402 may command various PWM signals through the timer hardware 450. For example, processor 402 may command generation of a PWM signal for each phase of phase X, phase Y, and phase Z, for a three-phase inverter such as the inverter 110. As a result, the timer hardware 450 may generate a first commanded PWM signal 460, a second commanded PWM signal 462, and a third commanded PWM signal 464. The phases X, Y, and Z may correspond to phases U, V, W shown for the inverter 110 in FIG. 2. The first commanded PWM signal 460, the second commanded PWM signal 462, and the third commanded PWM signal 464 may be transmitted to and received by the deadtime hardware 470. The deadtime hardware 470 may then generate a high-side output signal and a low side output signal for each phase. For example, the deadtime hardware 470 may generate a high-side output signal 472 and a low-side output signal 474, for phase X, based on the first commanded PWM signal 460. The deadtime hardware 470 may generate a high-side output signal 476 and a low-side output signal 478, for phase Y, based on the second commanded PWM signal 462. The deadtime hardware 470 may generate a high-side output signal 480 and a low-side output signal 482, for phase z, based on the third commanded PWM signal 464.

The deadtime hardware 470 may transmit each of the above-mentioned high-side and low-side output signals to a gate drive interconnected circuit (IC) 490, and the gate drive IC 490 may be configured to control switching operations of the inverter 110 based on the above-mentioned high-side and low-side output signals. However, the gate drive IC 490 may be excluded from the system in some embodiments, or may be bypassed in some embodiments. For example, the inverter controller 400 may control the switching operations of the inverter 110 directly without any intervening operation by the gate drive IC 490.

FIG. 5 depicts a plot 500 of various pulse-width modulation (PWM) signals for controlling an inverter, according to one or more embodiments. The plot 500 illustrates a commanded PWM signal 560, a high-side output signal 572, and a low-side output signal 574. The commanded PWM signal 560 may correspond to one of the first commanded PWM signal 460, the second commanded PWM signal 462, or the third commanded PWM signal 464, for controlling a particular phase of the inverter 110. As such, the timer hardware 450 may generate the commanded PWM signal 560.

The high-side output signal 572 may correspond to one of the high-side output signal 472, the high-side output signal 476, or the high-side output signal 480 based on a phase of the inverter 110 that may be controlled by the commanded PWM signal 560. For example, the high-side output signal 572 may be used for controlling one of the high-side switches Q1, Q3, or Q5, depending on the phase of the inverter 110 that may be controlled by the commanded PWM signal 560. The low-side output signal 574 may correspond to one of the low-side output signal 474, the low-side output signal 478, or the low-side output signal 482, based on the phase of the inverter 110 that may be controlled by the commanded PWM signal 560. For example, the low-side output signal 574 may be used for controlling one of the low-side switches Q4, Q6, or Q2, depending on the phase of the inverter 110 that may be controlled by the commanded PWM signal 560. As such, the deadtime hardware 470 may generate the high-side output signal 572 and the low-side output signal 574.

The plot 500 depicts PWM signals generated for one period, as an example. The commanded PWM signal 560 may include an on-time pulse 562, which may be a high state of the commanded PWM signal 560 between a rising edge 544 and a falling edge 546. Similarly, the high-side output signal 572 may include an on-time pulse 566 as a high state between a respective rising edge and a falling edge, and the low-side output signal 574 may include an off-time pulse 568 as a low state between a respective falling edge and a rising edge. When the commanded PWM signal 560 rises or changes to a high state from a low state as indicated by the rising edge 544, the deadtime hardware 470 may immediately change a state of the low-side output signal 574 from a high state to a low state, as indicated by a falling edge of the low-side output signal 574. The high-side output signal 572 may be changed to a high state from a low state after a first deadtime 526. For example, the first deadtime 526 may have a value of approximately 2 microseconds according to one non-limiting example. Similarly, when the commanded PWM signal 560 changes to the low state from the high state as indicated by the falling edge 546, the high-side output signal 572 may be immediately changed to the low state from the high state, as indicated by the falling edge of the high-side output signal 572. The low-side output signal 574 may be changed to the high state from the low state after a second deadtime 528. For example, the second deadtime 528 may have a same value as the first deadtime 526 or may have a different value.

The first deadtime 526 may be associated with the rising edge 544 of the commanded PWM signal 560. The second deadtime 528 may be associated with the falling edge 546 of the commanded PWM signal 560. The first deadtime 526 and the second deadtime 528 may be the same or may be different. The first deadtime 526 and the second deadtime 528 may be a part of a first deadtime configuration that may be applied by the deadtime hardware 470. Additionally, the first deadtime 526 may be stored in a first register of the inverter controller 400, and the second deadtime 528 may be stored in a second register of the inverter controller 400. For example, the first register may be associated with storing deadtime values associated with the rising edge 544, and the second register may be associated with storing deadtime values associated with the falling edge 546. The on-time pulse 566 may have a pulse width that corresponds to a pulse width of the on-time pulse 562 less the first deadtime 526. The off-time pulse 568 may have a pulse width that corresponds to a sum of the pulse width of the on-time pulse 562 and the second deadtime 528.

Figure 6:
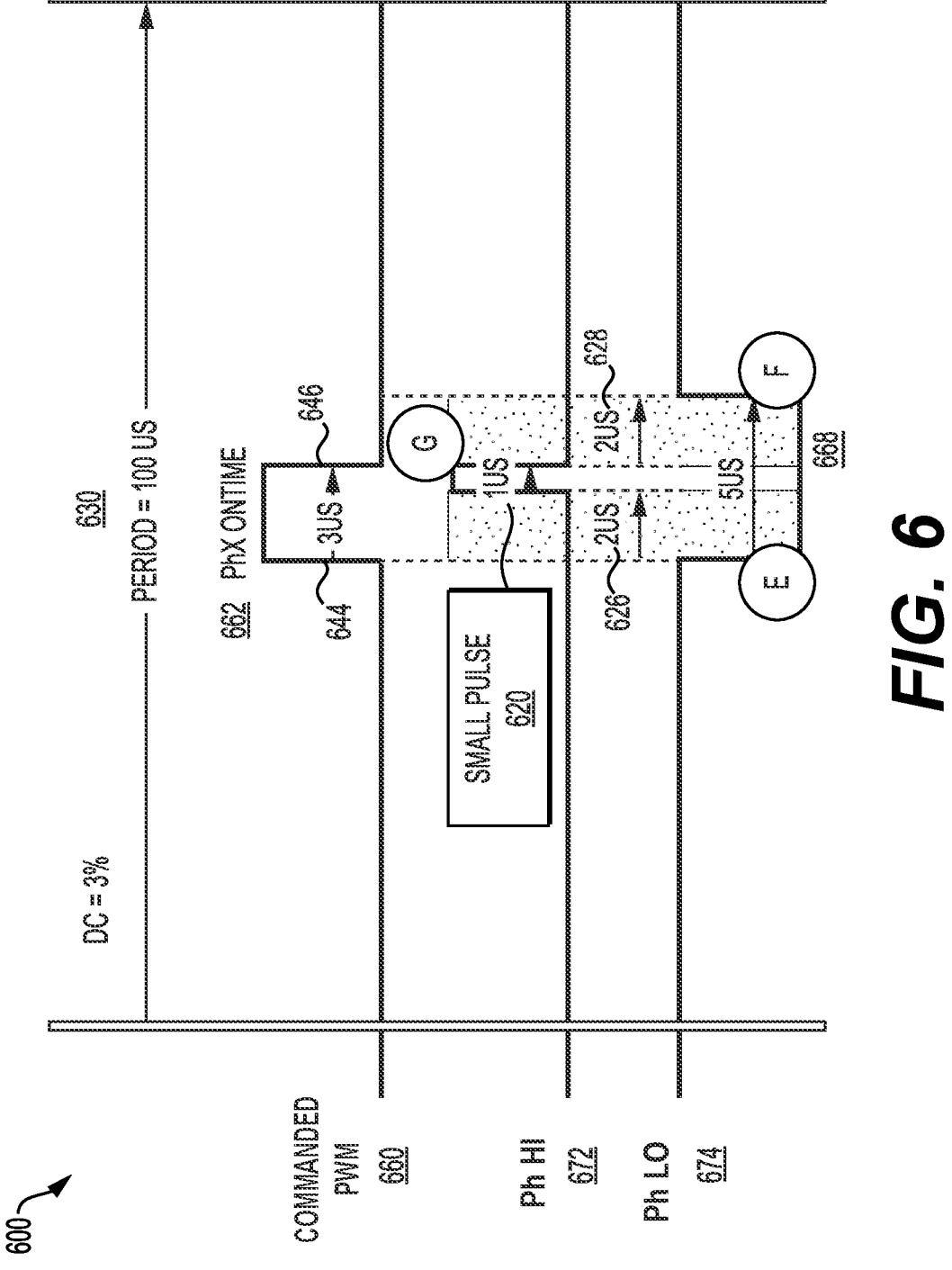
FIG. 6 depicts a plot of various PWM signals including a small pulse that may be generated for a high-side output signal, according to one or more embodiments.

FIG. 6 depicts a plot 600 of various PWM signals including a small pulse that may be generated for a high-side output signal, according to one or more embodiments. The plot 600 illustrates a commanded PWM signal 660, a high-side output signal 672, and a low-side output signal 674. The commanded PWM signal 660 may correspond to one of the first commanded PWM signal 460, the second commanded PWM signal 462, or the third commanded PWM signal 464, for controlling a particular phase of the inverter 110. The high-side output signal 672 may correspond to one of the high-side output signal 472, the high-side output signal 476, or the high-side output signal 480 based on a phase of the inverter 110 that may be controlled by the commanded PWM signal 660. For example, the high-side output signal 672 may be used for controlling one of the high-side switches Q1, Q3, or Q5 depending on the phase of the inverter 110 that may be controlled by the commanded PWM signal 660. The low-side output signal 674 may correspond to one of the low-side output signal 474, the low-side output signal 478, or the low-side output signal 482, based on the phase of the inverter 110 that may be controlled by the commanded PWM signal 660. For example, the low-side output signal 674 may be used for controlling one of the low-side switches Q4, Q6, or Q2 depending on the phase of the inverter 110 that may be controlled by the commanded PWM signal 660. As such, the deadtime hardware 470 may generate the high-side output signal 672 and the low-side output signal 674.

The commanded PWM signal 660 may include an on-time pulse 662 which may be a high state of the commanded PWM signal 660 between a rising edge 644 and a falling edge 646. Similarly, the high-side output signal 672 may include an on-time small pulse 620 as a high state between a respective rising edge and a falling edge, and the low-side output signal 674 may include an off-time pulse 668 as a high state between a respective falling edge and a rising edge. When the commanded PWM signal 660 rises or changes to a high state from a low state as indicated by the rising edge 644, the deadtime hardware 470 may immediately change a state of the low-side output signal 674 from a high state to a low state, as indicated by a falling edge of the low-side output signal 674.

The high-side output signal 672 may be changed to a high state from a low state after a first deadtime 626. For example, the first deadtime 626 may have a value of approximately 2 microseconds according to one non-limiting example. Similarly, when the commanded PWM signal 660 changes to the low state from the high state as indicated by the falling edge 646, the high-side output signal 672 may be immediately changed to the low state from the high state, as indicated by the falling edge of the high-side output signal 672. The low-side output signal 674 may be changed to the high state from the low state after a second deadtime 628. For example, the second deadtime 628 may have a same value as the first deadtime 626 or may have a different value.

The first deadtime 626 may be associated with the rising edge 644 of the commanded PWM signal 660. The second deadtime 628 may be associated with the falling edge 646 of the commanded PWM signal 660. The first deadtime 626 and the second deadtime 628 may be the same or may be different. The first deadtime 626 and the second deadtime 628 may be a part of a first deadtime configuration that may be applied by the deadtime hardware 470. Additionally, the first deadtime 626 may be stored in a first register of the inverter controller 400, and the second deadtime 628 may be stored in a second register of the inverter controller 400. For example, the first register may be associated with storing deadtime values associated with the rising edge 644, and the second register may be associated with storing deadtime values associated with the falling edge 646.

The plot 600 depicts PWM signals generated for a period 630, as an example. As discussed previously, problems may arise when a PWM subsystem allows a small pulse to reach gate drive hardware, which may degrade switching devices for an inverter, such as the high-side switches and the low-side switches of the inverter 110. According to one non-limiting example for the plot 600, the period 630 may be approximately 100 microseconds, the first deadtime 626 and the second deadtime 628 may both be approximately 2 microseconds, and a minimum pulse width for both the high-side output signal 672 and the low-side output signal 674 may correspond to approximately 1 microsecond. In this example, a 3% duty cycle may be commanded on a center aligned PWM signal, which may result in an on-time pulse 662 of approximately 3 microseconds for the commanded PWM signal 660 for the period 630. As an example, the first deadtime 626 and the second deadtime 628 may be from approximately 0 microseconds to approximately 4 microseconds, and a minimum pulse width for the high-side output signal 672 and the low-side output signal 674 may be from approximately 0 microseconds to approximately 3 microseconds. In other aspects, the minimum pulse width may range from approximately 0% of the period 630 to approximately 3% of the period 630, and each of the first deadtime 626 and the second deadtime 628 of the first deadtime configuration may be larger than the minimum pulse width and range from approximately 0% of the period 630 to approximately 4% of the period 630. The aforementioned relationship between the minimum pulse width, the period 630, and each of the first deadtime 626 and the second deadtime 628 may be maintained and applicable to fluctuating values for the period 630.

When the change of state occurs from the low state to the high state at the rising edge 644, the deadtime hardware 470 may cause the low-side output signal 674 to change from the high state to the low state at "E." After approximately 2 microseconds (e.g., corresponding to the first deadtime 626), the deadtime hardware 470 may cause the high-side output signal 672 to change from the low state to the high state. When the change of state occurs from the high state to the low state at the falling edge 646, the deadtime hardware 470 may cause the high-side output signal 672 to change from the high state to the low state. After approximately 2 microseconds (e.g., corresponding to the second deadtime 628), the deadtime hardware 470 may cause the low-side output signal 674 to change from the low state to the high state at "F." As a result, inverter controller 400 may determine that a small pulse 620 corresponding to a pulse width of approximately 1 microsecond may be generated at "G" for the high-side output signal 672. The small pulse 620 that is generated may have a pulse width smaller than or equal to the minimum allowed pulse width value for the high-side output signal 672.

Figure 7:
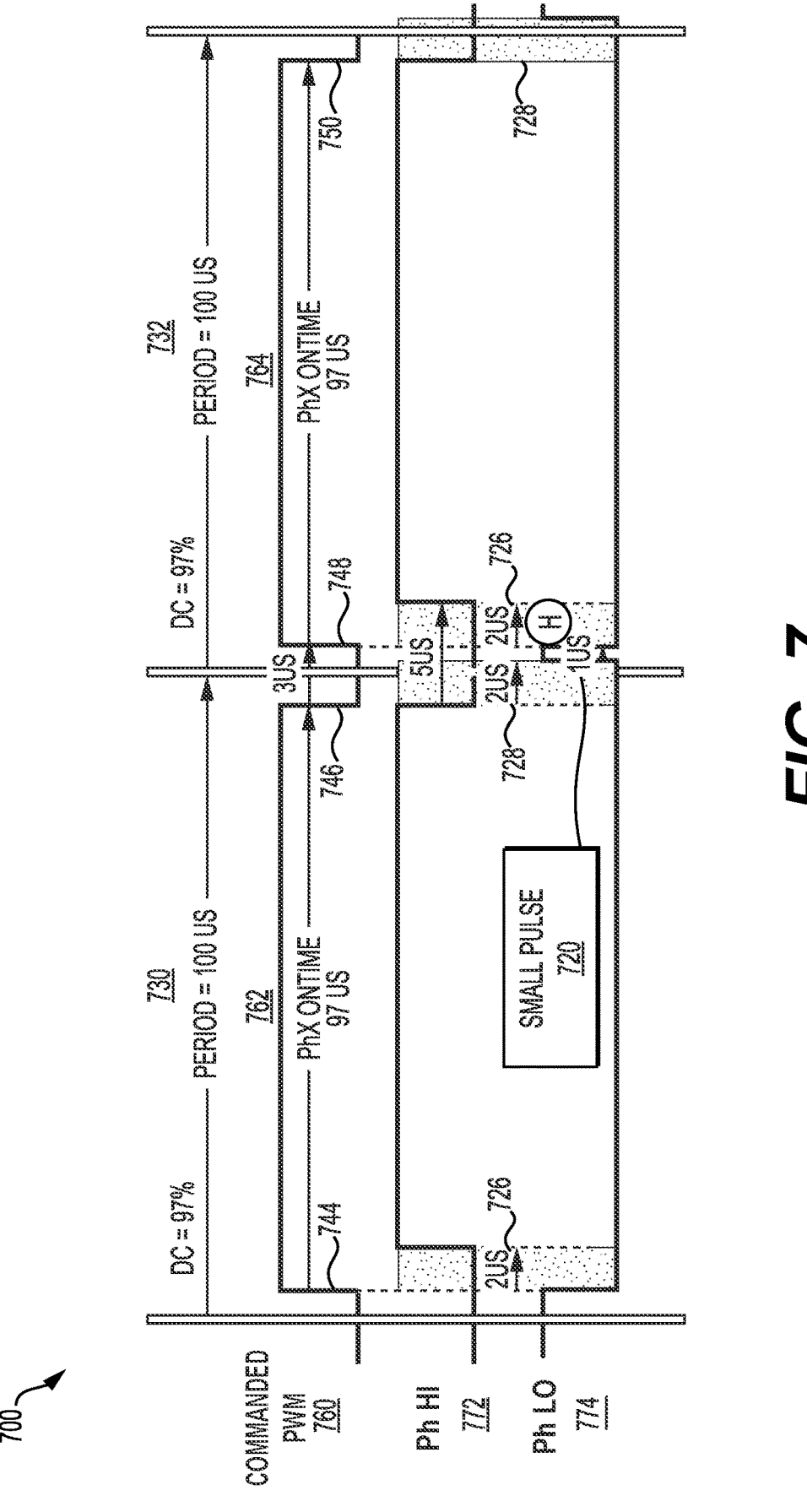
FIG. 7 depicts a plot of various PWM signals including a small pulse that may be generated for a low-side output signal, according to one or more embodiments.

FIG. 7 depicts a plot 700 of various PWM signals including a small pulse that may be generated for a low-side output signal, according to one or more embodiments. The plot 700 illustrates a commanded PWM signal 760, a high-side output signal 772, and a low-side output signal 774. The commanded PWM signal 760 may correspond to one of the first commanded PWM signal 460, the second commanded PWM signal 462, or the third commanded PWM signal 464, for controlling a particular phase of the inverter 110. The high-side output signal 772 may correspond to one of the high-side output signal 472, the high-side output signal 476, or the high-side output signal 480 based on a phase of the inverter 110 that may be controlled by the commanded PWM signal 760. For example, the high-side output signal 772 may be used for controlling one of the high-side switches Q1, Q3, or Q5 depending on the phase of the inverter 110 that may be controlled by the commanded PWM signal 760. The low-side output signal 774 may correspond to one of the low-side output signal 474, the low-side output signal 478, or the low-side output signal 482, based on the phase of the inverter 110 that may be controlled by the commanded PWM signal 760. For example, the low-side output signal 774 may be used for controlling one of the low-side switches Q4, Q6, or Q2 depending on the phase of the inverter 110 that may be controlled by the commanded PWM signal 760. As such, the deadtime hardware 470 may generate the high-side output signal 772 and the low-side output signal 774.

The commanded PWM signal 760 may include a first on-time pulse 762 and a second on-time pulse 764. The first on-time pulse 762 may be a high state of the commanded PWM signal 760 between a rising edge 744 and a falling edge 746 for first period 730. The second on-time pulse 764 may be a high state of the commanded PWM signal 760 between a rising edge 748 and a falling edge 750 for second period 732. Similarly, the high-side output signal 772 may include a first on-time pulse for the first period 730 (a high state between a respective rising edge and falling edge) and a second on-time pulse for the second period 732 (a high state between a respective rising edge and falling edge).

The first deadtime 726 may be associated with the rising edge 744 of the commanded PWM signal 760. The second deadtime 728 may be associated with the falling edge 746 of the commanded PWM signal 760. The first deadtime 726 and the second deadtime 728 may be the same or may be different. The first deadtime 726 and the second deadtime 728 may be a part of a first deadtime configuration that may be applied by the deadtime hardware 470. Additionally, the first deadtime 726 may be stored in a first register of the inverter controller 400, and the second deadtime 728 may be stored in a second register of the inverter controller 400. For example, the first register may be associated with storing deadtime values associated with the rising edge 744, and the second register may be associated with storing deadtime values associated with the falling edge 746.

The plot 700 depicts PWM signals generated for two periods, e.g., the first period 730 and the second period 732. According to one non-limiting example for the plot 700, the first period 730 and the second period 732 may both be approximately 100 microseconds, the first deadtime 726 and the second deadtime 728 may both be approximately 2 microseconds, and a minimum pulse width for both the high-side output signal 772 and the low-side output signal 774 may be approximately 1 microsecond. In this example, a 97% duty cycle may be commanded for both the first period 730 and the second period 732, which may result in the first on-time pulse 762 and the second on-time pulse 764 both being approximately 97 microseconds.

For the first period 730, when the commanded PWM signal 760 rises or changes to the high state from a low state as indicated by the rising edge 744, the deadtime hardware 470 may immediately change a state of the low-side output signal 774 from a high state to a low state, as indicated by a respective falling edge of the low-side output signal 774. The high-side output signal 772 may be changed to a high state from a low state after the first deadtime 726. Similarly, when the commanded PWM signal 760 changes to the low state from the high state as indicated by the falling edge 746, the high-side output signal 772 may be immediately changed to the low state from the high state, as indicated by a respective falling edge of the high-side output signal 772. The low-side output signal 774 may be changed to the high state from the low state after the second deadtime 728.

For the second period 732, when the commanded PWM signal 760 rises or changes to the high state from the low state as indicated by the rising edge 748, the deadtime hardware 470 may immediately change a state of the low-side output signal 774 from the high state to the low state, as indicated by a respective falling edge of the low-side output signal 774. The high-side output signal 772 may be changed to the high state from the low state after the first deadtime 726. Next, when the commanded PWM signal 760 changes from the high state to the low state, as indicated by falling edge 750, the deadtime hardware 470 may immediately change a state of the high-side output signal 772 from the high state to the low state, as indicated by a respective falling edge for the high-side output signal 772. After the second deadtime 728, the deadtime hardware 470 may change a state of the low-side output signal 774 from the low state to the high state. As a result, the inverter controller 400 may determine that a small pulse 720 corresponding to a pulse width of approximately 1 microsecond may be generated at "H" for the low-side output signal 774 at or near a period boundary of the first period 730 and the second period 732. The resulting small pulse 720 may have a pulse width smaller than or equal to the minimum allowed as defined by the minimum pulse width value for both the high-side output signal 772 and the low-side output signal 774.

Figure 8:
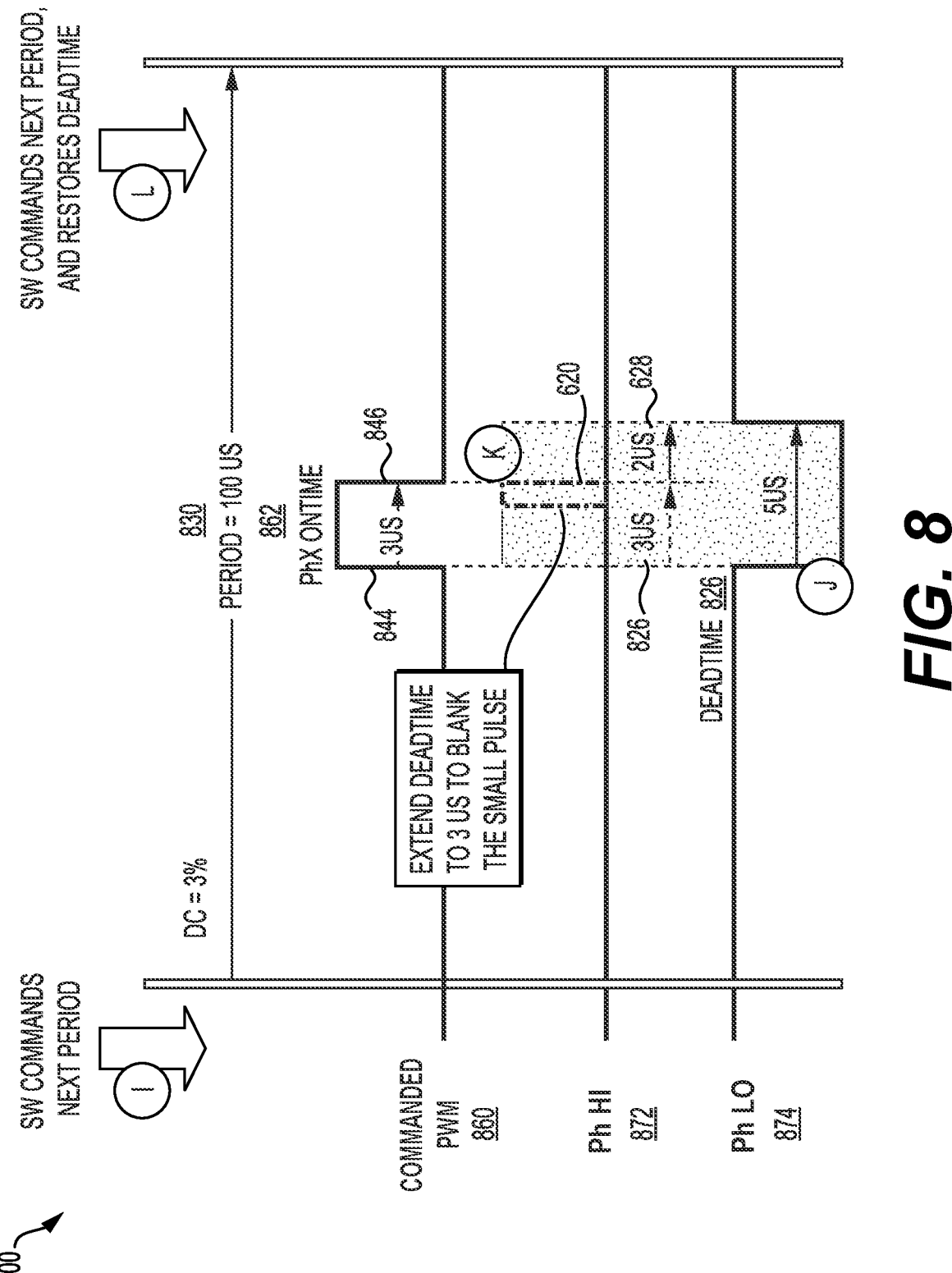
FIG. 8 depicts a plot of various PWM signals adjusted to prevent a small pulse from being generated for a high-side output signal, according to one or more embodiments.

FIG. 8 depicts a plot 800 of various PWM signals for preventing a small pulse from being generated for a high-side output signal, according to one or more embodiments. The plot 800 is described with reference to the plot 600 for preventing the small pulse 620 from being generated. As such, commanded PWM signal 860, high-side output signal 872, and low-side output signal 874 correspond to the commanded PWM signal 660, the high-side output signal 672, and the low-side output signal 674, respectively. Additionally, period 830 corresponds to the period 630 for a 3% duty cycle for the commanded PWM signal 860. Additionally, the commanded PWM signal 860 is associated with a rising edge 844 and a falling edge 846 and includes an on-time pulse 862. The rising edge 844, the falling edge 846, and the on-time pulse correspond to the rising edge 644, the falling edge 646, and the on-time pulse 662, respectively.

The inverter controller 400 may enable use of existing deadtime hardware such as the deadtime hardware 470 to blank (or remove) a small pulse that may be generated for either the high-side output signal 872 or the low-side output signal 874. For example, the inverter controller 400 may determine at "I" that the small pulse 620 will be generated for the high-side output signal 872, in accordance with the description of the plot 600 in FIG. 6. To prevent the small pulse 620 from being generated, the inverter controller 400 may determine a second deadtime configuration, different from the first deadtime configuration (e.g., described with respect to FIG. 6), to apply at the rising edge 844. For example, the first deadtime 626 and the second deadtime 628 may both be approximately 2 microseconds. The inverter controller 400 may determine a new first deadtime 826 to be applied at the rising edge 844. The new first deadtime 826 may be different from the first deadtime 626 and may be determined by adding a determined minimum pulse width value to the first deadtime 626, thereby extending (or increasing) the first deadtime 626 by the determined minimum pulse width value. For example, the inverter controller

400 may determine that the minimum pulse width is approximately 1 microsecond. Based on this, the new first deadtime 826 may be approximately 3 microseconds. The new first deadtime 826 may be associated with the rising edge 844 (e.g., to be applied in response to the occurrence of the rising edge 844). The new first deadtime 826 may be stored in the first register of the inverter controller 400, with the first deadtime 626.

The inverter controller 400 may apply the second deadtime configuration with the new first deadtime 826 to the high-side output signal 872 and the low-side output signal 874 to prevent the small pulse 620 from being generated. Referring to the example above with the new first deadtime 826 being approximately 3 microseconds, when the rising edge 844 occurs, the deadtime hardware 470 may immediately change a state of the low-side output signal 874 from the high state to the low state at "J." However, instead of the high-side output signal 872 changing from the low state to the high state after approximately 2 microseconds according to the first deadtime 626, the deadtime hardware 470 may apply the new first deadtime 826 of approximately 3 microseconds. However, after a delay of approximately 3 microseconds, the commanded PWM signal 860 may be configured to change from the high state to the low state. Accordingly, before a rising edge (e.g., change of state from the low state to the high state) may occur for the high-side output signal 872, the commanded PWM signal 860 has already changed to the low state as depicted by the falling edge 846. Thus, the high-side output signal 872 may be forced to maintain the low state before turning on and changing to the high state, thereby removing or preventing the small pulse 620 from being generated at "K."

After the falling edge 846 occurs, the low-side output signal 874 may change from the low state to the high state after the second deadtime 628, which may be approximately 2 microseconds according to the current example. The new first deadtime 826 may be applied instead of the first deadtime 626 and the second deadtime 628 of approximately 2 microseconds may remain in effect for the falling edge 846. Thus, the deadtime hardware 470 may apply the second deadtime 628 of approximately 2 microseconds in response to the falling edge 846 occurring, which may cause a state of the low-side output signal 874 to change from the low state to the high state after approximately 2 microseconds.

At the end of the period 830 and before the commanded PWM signal 860 is commanded for a next period after the period 830, the first deadtime configuration may be restored at "L." That is, the first deadtime 626 may be restored before a start of the next period so that the first deadtime 626 may be applied for the next period instead of the new first deadtime 826, in response to an occurrence of a rising edge of the commanded PWM signal 860 for the next period, thereby providing normal deadtime protection for the inverter 110 for the next period. Therefore, the high-side output signal 872 may maintain the low state for an entirety of the period 830.

Figure 9:
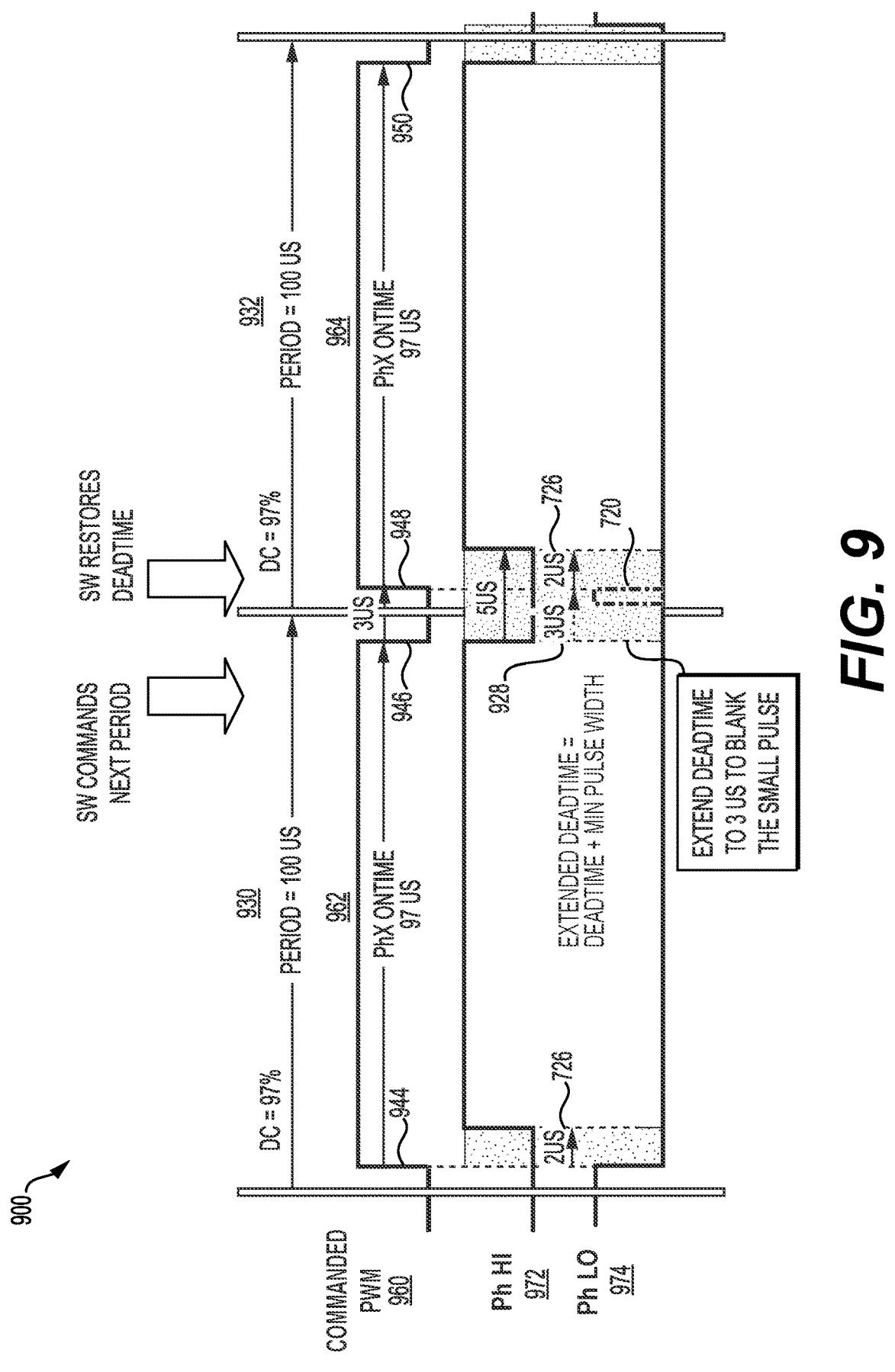
FIG. 9 depicts a plot of various PWM signals adjusted to prevent a small pulse from being generated for a low-side output signal, according to one or more embodiments.

FIG. 9 depicts a plot 900 of various PWM signals for preventing a small pulse from being generated for a low-side output signal, according to one or more embodiments. The plot 900 is described with reference to the plot 700 for preventing the small pulse 720 from being generated. As such, commanded PWM signal 960, high-side output signal 972, and low-side output signal 974 correspond to the commanded PWM signal 760, the high-side output signal 772, and the low-side output signal 774, respectively. Additionally, first period 930 and second period 932 correspond to the first period 730 and the second period 732, respectively, each corresponding to a 97% duty cycle for the commanded PWM signal 960. Additionally, the commanded PWM signal 960 is associated with a rising edge 944 and a falling edge 946 for the first period 930 and a rising edge 948 and a falling edge 950 for the second period 932. Additionally, on-time pulse 962 and on-time pulse 964 may correspond to the first on-time pulse 762 and the second on-time pulse 764, respectively.

The inverter controller 400 may enable use of existing deadtime hardware such as the deadtime hardware 470 to blank (or remove) a small pulse that may be generated for either the high-side output signal 872 or the low-side output signal 874. For example, the inverter controller 400 may determine that the small pulse 720 will be generated for the low-side output signal 974, in accordance with the description of the plot 700 in FIG. 7. To prevent the small pulse 720 from being generated, the inverter controller 400 may determine a second deadtime configuration, different from the first deadtime configuration (e.g., described with respect to FIG. 7), to apply to the falling edge 946. For example, the first deadtime 726 and the second deadtime 728 of the first deadtime configuration may both be approximately 2 microseconds. The inverter controller 400 may determine a new second deadtime 928 for the second deadtime configuration to be applied at the falling edge 946. The new second deadtime 928 may be different from the second deadtime 728 and may be determined by adding a determined minimum pulse width value to the second deadtime 728, thereby extending (or increasing) the second deadtime 728 by the determined minimum pulse width value. For example, the inverter controller 400 may determine that the minimum pulse width is approximately 1 microsecond. Based on this, the new second deadtime 928 may be approximately 3 microseconds. The new second deadtime 928 may be associated with the falling edge 946 (e.g., to be applied in response to the occurrence of the falling edge 946). The new second deadtime 928 may be stored in the second register of the inverter controller 400 with the second deadtime 728.

The inverter controller 400 may apply the second deadtime configuration with the new second deadtime 928 at the falling edge 946. Referring to the example above with the new second deadtime 928 being approximately 3 microseconds, when the rising edge 944 occurs, the deadtime hardware 470 may immediately change a state of the low-side output signal 974 from the high state to the low state. After the first deadtime 726 (e.g., corresponding to approximately 2 microseconds), the deadtime hardware 470 may change a state of the high-side output signal 972 from the low state to the high state.

Referring to the above example, when the commanded PWM signal 960 changes from the high state to the low state at the falling edge 946, the deadtime hardware 470 may immediately change a state of the high-side output signal 972 from the high state to the low state. However, instead of the low-side output signal 974 changing from the low state to the high state after approximately 2 microseconds according to the second deadtime 728, the deadtime hardware 470 may apply the new second deadtime 928 of approximately 3 microseconds. However, after a delay of approximately 3 microseconds, the commanded PWM signal 960 may be configured to change from the low state to the high state. Accordingly, before a rising edge (e.g., change of state from the low state to the high state) may occur for the low-side output signal 974, the commanded PWM signal 860 has already changed to the high state as depicted by the rising edge 948. Thus, the low-side output signal 974 may be forced to maintain the low state before having turning on and changing to the high state, thereby removing or preventing the small pulse 720 from being generated.

After the first period 930, the first deadtime configuration may be restored early in the second period 932. That is, the second deadtime 728 may be in effect rather than the new second deadtime 928 (e.g., so that the second deadtime 728 is to be applied in response to occurrences of any subsequent falling edges for the commanded PWM signal 960) before an occurrence of a subsequent falling edge for the commanded PWM signal 960 for the second period 932. For example, although not depicted for the plot 900, the duty cycle of the commanded PWM signal 960 may be different than 97% for the second period 932 and another small pulse that may be generated near the center of the second period 932 may be detected by the inverter controller 400. Restoring the first deadtime configuration before occurrences of any subsequent falling edges for the second period 932 may ensure that normal deadtime protection is in place for the inverter 110.

FIG. 10 depicts an exemplary method 1000 for preventing a small pulse from being generated, according to one or more embodiments. The method 1000 may be implemented by the inverter controller 400, for controlling the high-side switches and/or the low-side switches of the inverter 110. The method 1000 may be applicable for preventing a small pulse from being generated at a high-side output signal or a low-side output signal (e.g., the high-side output signal 872, the high-side output signal 972, the low-side output signal 874, or the low-side output signal 974). At operation 1002, the inverter controller 400 may determine a commanded PWM signal (e.g., one of the commanded PWM signal 860 or the commanded PWM signal 960) for a particular phase of the inverter 110. The inverter controller 400 may determine a corresponding on-time pulse for a first period and/or a second period based on the determined commanded PWM signal.

At operation 1004, the inverter controller 400, and particularly, a PWM driver, may calculate an on-time pulse that may be generated for a corresponding low-side output signal and a corresponding high-side output signal based on the determined commanded PWM signal. The inverter controller 400 may further be configured to determine a minimum pulse width value applicable to the corresponding low-side output signal and the corresponding high-side output signal. Additionally, the inverter controller 400 may be configured to determine a first deadtime configuration (also referred to herein as a default deadtime configuration) that may be applied to the corresponding low-side output signal and the corresponding high-side output signal. The first deadtime configuration may include a first deadtime value (e.g., the first deadtime 626 and/or the first deadtime 726) and a second deadtime value (e.g., the second deadtime 628 and/or the second deadtime 728).

At operation 1006, the inverter controller 400 may be configured to determine if the on-time pulse that may be generated for the corresponding low-side output signal and/or the corresponding high-side output signal is less than or equal to the determined minimum pulse width value, thereby detecting a small pulse (e.g., the small pulse 620 and/or the small pulse 720) that may be generated. If the inverter controller 400 determines that the on-time pulse that may be generated for the corresponding low-side output signal and/or the corresponding high-side output signal is less than or equal to the determined minimum pulse width value, the method 1000 proceeds to operation 1008. If the inverter controller 400 determines that the on-time pulse that may be generated for the corresponding low-side output signal and/ or the corresponding high-side output signal is not less than or equal to the determined minimum pulse width value, the method 1000 proceeds to operation 1010.

At operation 1008, the inverter controller 400 may configure the deadtime hardware 470 to determine a second deadtime configuration to be applied to the corresponding low-side output signal and/or the corresponding high-side output signal. For example, the second deadtime configuration may include a new first deadtime (e.g., the new first deadtime 826) or a new second deadtime (e.g., the new second deadtime 928). As a result of applying the second deadtime configuration, the generation of a small pulse (e.g., the small pulse 620 and/or the small pulse 720) may be prevented at the corresponding low-side output signal or the corresponding high-side output signal. The second deadtime configuration may be applied or executed immediately to prevent generation of a small pulse at or near a period boundary, e.g., the small pulse 720 may be detected to occur at or near the period boundary of the first period 930 and the second period 932.

Additionally and/or alternatively, if the detected small pulse that may be generated is determined to occur at a center of a period, e.g., the center of the period 830, a flag may be set to apply the second deadtime configuration after a period boundary to prevent a small pulse at a center of a subsequent period. Further explanation of this operation is given with respect to method 1100 at FIG. 11.

At operation 1010, the first deadtime configuration may be maintained for the corresponding low-side output signal and/or the corresponding high-side output signal as no small pulse that may be generated is detected.

FIG. 11 depicts an exemplary method 1100 for preventing a small pulse from being generated at a center of a period, according to one or more embodiments. The method 1100 may be implemented by the inverter controller 400, for controlling the high-side switches and/or the low-side switches of the inverter 110. The method 1100 may be applicable for preventing a small pulse from being generated at a high-side output signal or a low-side output signal (e.g., the high-side output signal 872, the high-side output signal 972, the low-side output signal 874, or the low-side output signal 974). At operation 1102, the inverter controller 400 may determine if a flag is set to apply the second deadtime configuration (e.g., corresponding to the second deadtime configuration described with respect to the method 1100) after a period boundary to prevent a small pulse at a center of a subsequent period. If the flag is set, the method 1100 proceeds to operation 1104. If the flag is not set, the method 1100 proceeds to operation 1106.

At operation 1104, the inverter controller 400 may be configured to apply the second deadtime configuration immediately, to prevent generation of the small pulse detected (e.g., detected at operation 1006) to occur at the center of the subsequent period.

At operation 1106, the first deadtime configuration (e.g., corresponding to the first deadtime configuration described with respect to the method 1100) may be maintained for the corresponding low-side output signal and/or the corresponding high-side output signal as no small pulse that may be generated is detected.

The inverter controller 400 as described herein may be configured to prevent generation of detected small pulses for a high-side output signal and/or a low-side output signal based on modifying deadtime configurations. Particularly, the deadtime hardware 470 may prevent generation of detected small pulses, while preserving deadtime protection of the inverter controller 400. Additionally, the embodiments described herein may reconfigure existing deadtime configurations to prevent generation of small pulses. Further, the embodiments described herein may leverage the protection of existing deadtime hardware of the inverter controller 400, which may provide that the hardware is protected from software issues.

Therefore, one or more embodiments may prevent the generation of small pulses and prevent small pulses from being delivered to a first switch of a high-side or a second switch of a low-side for a particular phase of an inverter. One or more embodiments may enable command of a full duty cycle range of PWM signals by blanking (e.g., removing) a small pulse for one of a high-side output or a low-side output, while allowing a pulse of the opposite low-side output or high-side output to continue to decrease. This may enable a commanded PWM signal to reach a full 0% to 100% range, while a pulse of the high-side output or the low-side output is held constant (no pulse) and the pulse of the opposite low-side output or high-side output can continue to shrink until a deadtime is achieved for the high-side output and the low-side output for the first switch and the second switch.

One or more embodiments may include a hardware solution that may first filter a small pulse (e.g., less than approximately 0.5 microsecond), and then stretch any remaining small pulses so that the pulse width is e.g., approximately 0.5 microsecond<pulse width<approximately 1 microsecond. One or more embodiments may blank out a pulse using existing deadtime hardware. One or more embodiments may use software to stretch a pulse by changing a commanded PWM signal. One or more embodiments may support either removing or stretching a pulse as requested by the motor control logic. In contrast to a hardware specific solution that may not be able to provide an actual pulse width back to the upper layers of software, one or more embodiments may enable feedback of the actual pulse width back to the upper levels of software.

Accordingly, some software or hardware solutions which may control the on-times of phase outputs individually and manually changing the on-times when a small pulse is commanded may be solved by one or more embodiments which may reconfigure existing deadtime configurations to prevent generation of a small pulse. Thus, one or more embodiments may leverage the protection of existing deadtime hardware in a microcontroller, which may provide that the hardware is protected from software issues.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
an inverter including a first switch and a second switch;
one or more controllers configured to control the inverter by performing operations, the operations including:
generating a minimum pulse width value for a first pulse-width modulated (PWM) signal to control the first switch and for a second PWM signal to control the second switch, the first PWM signal and the second PWM signal associated with a commanded PWM signal;
determining that an on-time pulse to be generated for the first PWM signal will be less than or equal to the minimum pulse width value for a first period based on a first deadtime configuration; and in response to the determining:
determining a second deadtime configuration for the first PWM signal and the second PWM signal for the first period, the second deadtime configuration being different from the first deadtime configuration; and
generating the first PWM signal and the second PWM signal based on the second deadtime configuration, so that the generated first PWM signal maintains a low state for the first period and prevents the on-time pulse that is less than or equal to the minimum pulse width value,
wherein each of the first deadtime configuration and the second deadtime configuration includes one or more of:
a first deadtime value associated with a rising edge of the commanded PWM signal or a second deadtime value associated with a falling edge of the commanded PWM signal, and
wherein the first deadtime value for the first deadtime configuration and the first deadtime value for the second deadtime configuration are different, and the second deadtime value for the first deadtime configuration and the second deadtime value for the second deadtime configuration are the same.

2. The system of claim 1, wherein the first deadtime value or the second deadtime value of the first deadtime configuration is increased by the minimum pulse width value to determine the second deadtime configuration.

3. The system of claim 1, the operations further including:
before a start of a second period for the first PWM signal and the second PWM signal:
restoring the first deadtime configuration; and
applying the first deadtime configuration instead of the second deadtime configuration to the first PWM signal and the second PWM signal.

4. The system of claim 1, the operations further including:
after a start of a second period for the first PWM signal and the second PWM signal:
restoring the first deadtime configuration; and
applying the first deadtime configuration instead of the second deadtime configuration to the first PWM signal and the second PWM signal.

5. The system of claim 1, further comprising:
a gate drive integrated circuit configured to receive the first PWM signal and the second PWM signal and drive one or more operations of the inverter.

6. The system of claim 1, further comprising:
a motor configured to rotate based on one or more operations of the inverter, wherein the system is provided as a vehicle including the motor.

7. A method for controlling a system, the system including an inverter including a first switch and a second switch, the method comprising:
performing, by one or more controllers, operations for controlling the inverter, the operations including:
generating a minimum pulse width value for a first pulse-width modulated (PWM) signal to control the first switch and for a second PWM signal to control the second switch, the first PWM signal and the second PWM signal associated with a commanded PWM signal;
determining that an on-time pulse to be generated for the first PWM signal will be less than or equal to the minimum pulse width value for a first period based on a first deadtime configuration; and
in response to the determining:
determining a second deadtime configuration for the first PWM signal and the second PWM signal for the first period, the second deadtime configuration different from the first deadtime configuration; and generating the first PWM signal and the second PWM signal based on the second deadtime configuration, so that the generated first PWM signal maintains a low state for the first period and prevents the on-time pulse that is less than or equal to the minimum pulse width value, wherein each of the first deadtime configuration and the second deadtime configuration includes one or more of:

a first deadtime value associated with a rising edge of the commanded PWM signal or a second deadtime value associated with a falling edge of the commanded PWM signal, and wherein the first deadtime value for the first deadtime configuration and the first deadtime value for the second deadtime configuration are the same, and the second deadtime value for the first deadtime configuration and the second deadtime value for the second deadtime configuration are different.

8. The method of claim 7, wherein the minimum pulse width value ranges from approximately 0% of the first period to approximately 3% of the first period, and each of the first deadtime value and the second deadtime value of the first deadtime configuration is larger than the minimum pulse width value and ranges from approximately 0% of the first period to approximately 4% of the first period.

9. The method of claim 7, wherein the first deadtime value or the second deadtime value of the first deadtime configuration is increased by the minimum pulse width value to determine the second deadtime configuration.

10. The method of claim 7, the operations further including:

before a start of a second period for the first PWM signal and the second PWM signal:

restoring the first deadtime configuration; and applying the first deadtime configuration instead of the second deadtime configuration to the first PWM signal and the second PWM signal.

11. The method of claim 7, the operations further including:

after a start of a second period for the first PWM signal and the second PWM signal:

restoring the first deadtime configuration; and applying the first deadtime configuration instead of the second deadtime configuration to the first PWM signal and the second PWM signal.

12. A system comprising:

one or more controllers configured to perform operations including:

generating a minimum pulse width value for a first pulse-width modulated (PWM) signal and for a second PWM signal, the first PWM signal and the second PWM signal associated with a commanded PWM signal for controlling a first switch and a second switch of an inverter;

determining that an on-time pulse to be generated for the first PWM signal will be less than the minimum pulse width value for a first period based on a first deadtime configuration; and in response to the determining:

determining a second deadtime configuration for the first PWM signal and the second PWM signal for the first period, the second deadtime configuration different from the first deadtime configuration; and generating the first PWM signal and the second PWM signal based on the second deadtime configuration, so that the generated first PWM signal maintains a low state for the first period and prevents the on-time pulse that is less than or equal to the minimum pulse width value, wherein each of the first deadtime configuration and the second deadtime configuration includes one or more of:

a first deadtime value associated with a rising edge of the commanded PWM signal or a second deadtime value associated with a falling edge of the commanded PWM signal, and wherein the determining the second deadtime configuration includes increasing the first deadtime value or the second deadtime value of the first deadtime configuration by the minimum pulse width value.

13. The system of claim 12, wherein the first deadtime value of the first deadtime configuration and the second deadtime configuration is stored in a first register of the one or more controllers, and the second deadtime value of the first deadtime configuration and the second deadtime configuration is stored in a second register of the one or more controllers.

14. The system of claim 12, the operations further including:

before a start of a second period for the first PWM signal and the second PWM signal:

restoring the first deadtime configuration; and applying the first deadtime configuration instead of the second deadtime configuration to the first PWM signal and the second PWM signal.

* * * * *